United States Patent [19]

Brenner

[11] Patent Number: 5,560,495
[45] Date of Patent: Oct. 1, 1996

[54] TRANSPORTER FOR AGGREGATE PRODUCED DURING REPROCESSING OF RESIDUAL CONCRETE

[76] Inventor: Horst Brenner, Breslauer Str. 14, D-71717 Beilstein, Germany

[21] Appl. No.: 392,765

[22] PCT Filed: Aug. 19, 1993

[86] PCT No.: PCT/DE93/00746

§ 371 Date: Feb. 23, 1995

§ 102(e) Date: Feb. 23, 1995

[87] PCT Pub. No.: WO94/04276

PCT Pub. Date: Mar. 3, 1994

[30] Foreign Application Priority Data

Aug. 25, 1992 [DE] Germany .................. 9211395 U

[51] Int. Cl.⁶ .................................................. B07B 1/04
[52] U.S. Cl. .................................. 209/273; 209/283
[58] Field of Search ........................... 209/273, 283, 209/305, 306

[56] References Cited

U.S. PATENT DOCUMENTS

| | | | |
|---|---|---|---|
| 2,044,043 | 6/1936 | Anderson | 209/283 X |
| 2,491,912 | 12/1949 | Walker | 209/273 X |
| 3,249,220 | 5/1966 | Bakke | 209/283 X |
| 3,251,467 | 5/1966 | Bakke | 209/283 X |
| 3,279,597 | 10/1966 | Reinhall | 209/273 X |
| 3,397,778 | 8/1968 | Karlsson | 209/283 X |
| 3,788,566 | 1/1974 | Morris, Jr. | 209/283 X |
| 3,886,063 | 5/1975 | Friesz . | |
| 3,981,738 | 9/1976 | Rao et al. | 209/273 X |
| 4,126,541 | 11/1978 | Orzechowski | 209/273 X |
| 4,396,501 | 8/1983 | Morey | 209/283 X |
| 5,202,416 | 4/1993 | Van Zee | 209/283 |

*Primary Examiner*—D. Glenn Dayoan
*Attorney, Agent, or Firm*—Anderson Kill Olick & Oshinsky, P.C.

[57] ABSTRACT

An apparatus for conveying the aggregate accumulated in the course of reprocessing of residual concrete in a bin is described which has a conveyance arrangement (10) of the type of a worm conveyor. The conveyor trough of this work conveyor (10) is configured as a flexible elastic path (16). Apertures exist in this path (16) which are suited for passage of no larger than a predetermined 1magnitude of aggregate which is conveyed out by the worm conveyor.

4 Claims, 1 Drawing Sheet

Figure
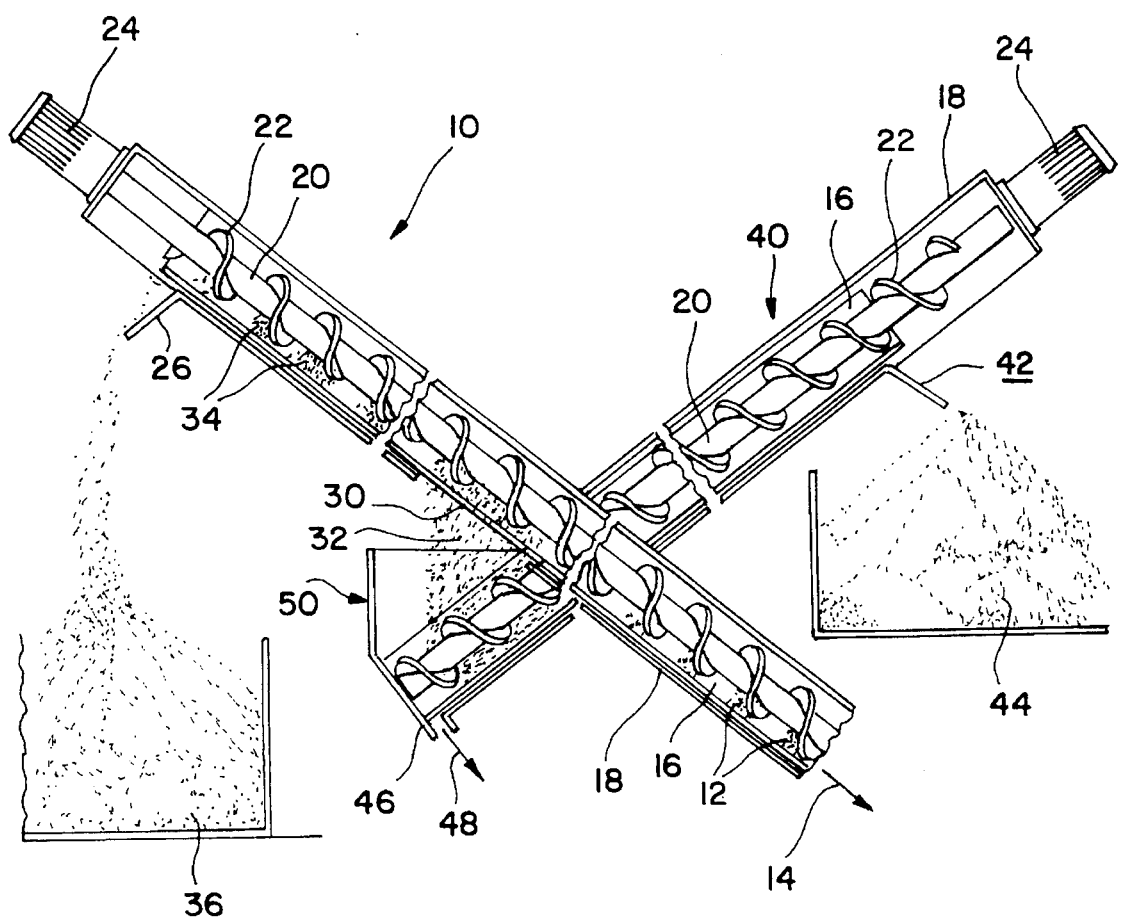

4
TRANSPORTER FOR AGGREGATE PRODUCED DURING REPROCESSING OF RESIDUAL CONCRETE

TECHNICAL AREA

The invention deals with an apparatus for bringing out or extracting aggregate from a reprocessing installation of residual concrete.

The reprocessing of unused quantities of residual concrete in concrete processing or transporting plants is increasingly demanded because of reasons of environmental protection. In addition, reprocessing is also associated with large economical advantages, since the accumulating ingredients such as gravel- and sand-ingredients and water consumed during the reprocessing can be reused in the manufacture of new concrete.

STATE OF THE ART

Such a conveyance device of the worm conveyor type is known from the German Utility Model 91 00 176. The conveyance trough of this worm conveyor is configured as a flexible elastic path. The conveyor protrudes with its lower end into a bin used for reprocessing the residual concrete. The worm conveyor conveys the purified aggregates, meaning the sand- and gravel-ingredients obliquely upwards out of the container. This enables to achieve the desired high dumping height of the aggregate. The recycling water conveyed out of the worm conveyor together with the discharge of the aggregate flows in the rearward direction again back into the bin. Since the shaft of this worm conveyor is supported externally of the charging region of the sand- and gravel-ingredients, which have to be conveyed outwardly, said shaft does not come into contact with the material being conveyed and virtually also not with the recycling water. This assures a high degree of maintenance freedom of this worm conveyor with a simultaneous high functionality. This type of worm conveyor produces an intermixture of sand- and gravel-ingredients.

DESCRIPTION OF THE INVENTION

Proceeding from the prior state of the art, the invention is based upon the task, of indicating a possibility for reprocessing residual concrete, by means of which the individual grain fractions of the aggregate to be processed, meaning in particular sand- and gravel-ingredients, can be separated from one another in as economical a manner as possible.

This invention is defined in the characteristics of patent claim 1. The conveyor with a conveyor arrangement of the worm conveyor type known in the state of the art is accordingly distinguished in that the conveyor trough in the worm conveyor configured in the form of a flexible elastic path is provided with apertures, which are suitable for permitting a specific grain size of the aggregate conveyed away by the worm conveyor to pass through. Thus it is achieved that for instance the gravel ingredients and thus the grain sizes having a larger diameter of the recyclable aggregate are collected on top out of the worm conveyor, while at another point of the worm conveyor a smaller grain size, for instance the sand ingredients of the recyclable aggregate fall out separately from the gravel ingredients from the worm conveyor. This enables to separate the gravel- and sand-ingredients of the aggregate collected during reprocessing of the residual concrete with an extraordinarily small effort and expense. In this case an optimum grain composition of the newly to be produced concrete is assured when this aggregate is used again.

Systems of screening installations for separating the different grain fractions are known in connection with the extraction of sand and gravel from sand- and gravel-pits. Economical considerations stand counter to the use of these sifting installations in the reprocessing of residual concrete, since such sifting installations would greatly increase the expenses of a reprocessing installation of residual concrete. On the other hand the use of these sifting or screening installations is not possible as a rule also due to design reasons, without a considerable additional effort or expense. Thus these sifting installations would have to be disposed beneath the worm conveyor, which would entail that the conveyor should be installed sufficiently high above the ground in the region of this sifting device. Namely sufficient drop or dumping height for storing these materials would have to be provided for the grain fractions dropping out of the sifting installation. Contrary thereto the inventive arrangement can eliminate such designwise expensive sifting installations which involve a correspondingly high construction level.

If the aggregate dropping down from the worm conveyor is to be stored at another spot than precisely beneath the worm conveyor, an additional conveyor installation can be positioned correspondingly beneath this first worm conveyor. This second worm conveyor can thus transport the aggregate dropping out of the apertures in the worm conveyor positioned above to any one desired spot. This additional conveyor installation disposed beneath the first one can also be configured as a worm conveyor.

In the present case we proceed from the circumstance, that the gravel ingredients can be obtained from the upper first worm conveyor and a second grain fraction, the sand ingredients, can be obtained from the lower second worm conveyor, separately from each other from the bin used for reprocessing the residual concrete. Several conveyors disposed respectively beneath each other can be arranged, if the aggregate obtained from the bin is to be separated not only in two, rather into more grain fractions. In these several conveyors, the apertures must be of different sizes corresponding to the grain size of the aggregate respectively falling through them. The diameter of the apertures diminishes correspondingly "downwards", meaning in the direction of the lower conveyors. The conveyors arranged beneath each other do not mean to be disposed precisely beneath each other as far as the apertures are concerned. Because of the use of rising or ascending conveyor arrangements such as worm conveyors, the regions with the apertures can be disposed so as to be offset to one another in space in the different conveyor arrangement when viewed in horizontal projection. Thus it is possible by a proper disposition of worm conveyors so as to be inclined in space, to arrange that the apertures in the respective conveyor troughs are also at the same mutual height.

The several worm conveyors can be arranged randomly in space or three-dimensionally; for instance it is also possible by way of an example to position preferably two conveyors one beneath the other because of space requirements. This uses-up extremely little space in the vicinity of the reprocessing installation. The ejection-or-drop height in the lowermost worm conveyor would then however be lower than in the worm conveyor disposed above. This again could be avoided by a worm conveyor angled off in the horizontal.

In order to prevent the recycling water, which is collected when conveying the aggregate to the uppermost conveyor arrangement followed by falling through the apertures onto the conveyor arrangement disposed respectively beneath, from being introduced into the waste water drain system without further use, all conveyor arrangements can be connected by means of a line connection to the bin used for reprocessing the residual concrete. This recycled water then always flows back into this bin. This bin can be a so-called scrubbing or washer tub resting on the ground or a basin embedded into the ground.

In order to facilitate passage of the aggregate through the apertures it was found to be expedient to apply water to the path area of the worm conveyors containing apertures. This water can be external water; however it is also possible to draw this water out of the bin used for reprocessing the residual concrete, so that this water would then be so-called recycling water.

The apertures designated above in the conveyors are in particular configured to be slot-like. These slots prevent, in cooperation with the flexible elastic path or track, where they are present, aggregate material from becoming jammed in the apertures and thus being unable to fall through said apertures. The conveyor trough configured as a flexible elastic path is more or less moved to and fro in a rolling-like motion during operation of the worm conveyor, so that the slots, should they have been blocked by a grain, can always be automatically reopened.

These slots are preferably oriented transversely, in particular perpendicularly to the conveyance direction of the aggregate in the path, so that grains are in the first place unable to jam in the slots.

A slot dimension of approximately 2 to 4 mm in width and 10 to 20 mm in length has been shown to be optimum in the usually collected residual concrete, so as to separate the sand ingredients from the sand-gravel-mixture.

SHORT DESCRIPTION OF THE DRAWING

In the following the invention is described and explained with particularity with the help of an embodiment example. The single FIGURE shows diagrammatically two conveyor arrangements in the invention disposed with partial regions one above the other.

METHODS FOR IMPLEMENTING THE INVENTION

A first worm conveyor 10 projects obliquely towards the top from a bin for reprocessing residual concrete not shown here. By means of this worm conveyor 10, sand-and-gravel ingredients 12 as well as slight quantities of water, which ingredients are collected during reprocessing of residual concrete in said bin, are conveyed obliquely towards the top out of this bin.

The water reaching the worm conveyor 10 flows back into this bin, which has been indicated by the arrow 14.

The worm conveyor 10 has a conveyor trough configured as a flexible elastic path 16. This conveyor trough is surrounded by a housing 18. The conveyance of sand- and- gravel ingredients 12 is accomplished by means of a screw or worm shovel 22 being made to revolve by a shaft 20. The shaft 20 is made to rotate by a motorized rotary drive 24 located at the upper end of the worm conveyor 10. An ejection aperture 26 is placed beneath this rotary drive 24, from which the aggregate arriving there falls out towards the bottom from the worm conveyor 10.

The housing 18 is interrupted in the central region of this worm conveyor 10. A larger quantity of slots 30 exists in this region of the path 16. These slots are in the present example disposed with their longitudinal orientation transversely to the longitudinal orientation of the worm conveyor 10. The slots could also be placed in another longitudinal orientation. The width of the slots 30 is of such a size, that only the sand ingredients 32 of the sand-gravel mixture 12 present on the worm conveyor 10 can fall through them. These sand ingredients 32 fall from above onto a second worm conveyor 40, which is configured similarly to the first worm conveyor 10. Thus only gravel ingredients 34 remain in the worm conveyor 10 above the slots 30, which then fall out of the worm conveyor 10 from the top. Thus a gravel heap or pile 36 forms beneath the ejection aperture 26 of the worm conveyor 10, which gravel heap virtually no longer contains any sand ingredients.

The sand 32 drops down from the worm conveyor 10 in the area of the slots 30 and lands on a second worm conveyor 40. This worm conveyor 40 is structured similarly to the first worm converter 10. It has also a central shaft 20 surrounded by a screw-shaped, revolving worm shovel 22. At the upper end of this worm conveyor 40 there exists again a rotary drive 24 powered by a motor. Beneath this region with the rotary drive 24, there exists an ejection aperture 42 from which the grain fraction arriving there from the worm conveyor 40 falls out to the bottom. This grain fraction is in the present case the sand ingredient 32, which has dropped out of the worm conveyor 20. Thus a sand heap or pile 44 forms beneath the ejection aperture 42.

In the worm conveyor 40 the flexible elastic path 16 surrounding the screw-type shovel 22 is not provided with apertures, so that the sand ingredients 32 which fall down into the worm conveyor 40 can again be completely ejected from the top of the worm conveyor 40. Only one flow out aperture 46 exists in the lower region of the worm conveyor 40, to which a water line leading to the reprocessing installation can be connected. Therein the water, having arrived into the area of the worm conveyor 40 after having flowed together with the sand 32 through the slots 30 of the worm conveyor 10, can again be conveyed out of the worm conveyor 40 and directed back into the bin provided for reprocessing the residual concrete. This water line is shown diagrammatically by the arrow 48.

The flow-out aperture 46 is configured and disposed in such a way, that only water and not also sand ingredients 32 can pass through same.

A quantity of sufficiently small holes can be placed for instance within the path 16 of the worm conveyor 40 in the vicinity of the aperture 46, so that only water can arrive in the region of the aperture 46 through the path 16 and thus through the holes. It is also possible to provide an overflow in the filling funnel 50 of the worm conveyor 40 instead of these apertures in the path 16.

The three-dimensional orientation of the worm conveyors 10, 40 depends upon the local conditions and also upon where the gravel heap 36 and the sand heap 44 are to be stored in the terrain externally of the reprocessing installation. The two worm conveyors 10, 40 can also be disposed with their longitudinal orientation one beneath the other. They do not need to be configured in a straight line. Rather they can be configured to be randomly curved or angled in space.

If not only, as in the present case, two rather more grain fractions are to be separated from each other, correspondingly several worm conveyors must be disposed beneath each other. The worm conveyor 40 as also the worm conveyor 10 can be equipped with slots 30 in its flexible elastic path, so that then an additional worm conveyor could be placed below the worm conveyor 40, which then could collect the third grain fraction, which would be smaller than the sand fraction, and could transport same away.

I claim:

1. An apparatus for extracting aggregate accumulating in a course of reprocessing of residual concrete in a bin, the apparatus comprising:

a worm conveyor for conveying the aggregate out of the bin and including a trough formed as a flexible elastic path, the flexible elastic path having apertures of a size not exceeding a predetermined grain size of the aggregate;

at least one additional conveyor means arranged beneath the worm conveyor and oriented randomly in space for conveying away at least one grain fraction falling through the apertures in the flexible elastic path of the worm conveyor; and first and second water lines for connecting the worm conveyor and the at least one additional conveyor with the bin, respectively, for returning water which is conveyed out of the bin with the aggregate, into the bin;

wherein the at least one additional conveyor means has a water-filling funnel.

2. An apparatus according to claim 1, wherein the at least one additional conveyor means comprises a worm conveyor.

3. An apparatus according to claim 1, wherein the apertures in the flexible eleastic path are formed as slots.

4. An apparatus according to claim 3, wherein the slots are oriented transversely to a conveyance direction of the worm conveyor for conveying the aggretate out of the bin.

\* \* \* \* \*